(12) United States Patent
Lanfranchi

(10) Patent No.: US 7,219,790 B2
(45) Date of Patent: May 22, 2007

(54) STAR-SHAPED CONVEYOR FOR FEEDING OR DISCHARGING EMPTY PLASTICS CONTAINERS OR BOTTLES TO OR FROM A MACHINE AND ORIENTING AND ALGINING MACHINE HAVING SAID STAR-SHAPED CONVEYOR

(75) Inventor: Lino Lanfranchi, Collecchio (IT)

(73) Assignee: Lanfranchi S.R.L., Collecchio (Parma) (IT)

( * ) Notice: Subject to any disclaimer, the term of this patent is extended or adjusted under 35 U.S.C. 154(b) by 0 days.

(21) Appl. No.: 10/541,398

(22) PCT Filed: Jan. 22, 2005

(86) PCT No.: PCT/EP2004/000508

§ 371 (c)(1),
(2), (4) Date: Jul. 1, 2005

(87) PCT Pub. No.: WO2004/074144

PCT Pub. Date: Sep. 2, 2004

(65) Prior Publication Data

US 2006/0243562 A1    Nov. 2, 2006

(30) Foreign Application Priority Data

Feb. 19, 2003   (IT)   .......................... PR2003A0013

(51) Int. Cl.
*B65G 47/34*   (2006.01)
(52) U.S. Cl. ................ 198/471.1; 198/478.1; 198/689.1
(58) Field of Classification Search ............ 198/478.1, 198/689.1, 471.1
See application file for complete search history.

(56) References Cited

U.S. PATENT DOCUMENTS

| 3,837,378 | A | * | 9/1974 | Kanki et al. | ............. | 198/689.1 |
| 4,009,776 | A | * | 3/1977 | Skrypek et al. | .......... | 198/471.1 |
| 6,098,781 | A | | 8/2000 | Lanfranchi | | |
| 6,540,065 | B2 | * | 4/2003 | Kurabe et al. | ........... | 198/471.1 |

FOREIGN PATENT DOCUMENTS

| DE | 40 10 601 | | 10/1991 | | |
| EP | 228351 | * | 7/1987 | .............. | 198/478.1 |
| EP | 1 142 807 | | 10/2001 | | |
| EP | 1 209 103 | | 5/2002 | | |
| JP | 58-172109 | | 10/1983 | | |

\* cited by examiner

Primary Examiner—James R. Bidwell
(74) Attorney, Agent, or Firm—Young & Thompson

(57) ABSTRACT

The invention refers to the field of systems for conveying empty plastics bottles and more precisely to a star-shaped conveyor adapted to feed or discharge empty bottles to or from an operative machine. Preferably, but not exclusively, the machine which the star-shaped conveyor is connected to, is a machine for orienting and aligning empty plastics bottles or containers. The star-shaped conveyor is provided with a plurality of recesses (4), a negative pressure is established in each recess for an arc between 90° and 180°, the arc starts in correspondence of a machine and ends in correspondence of a conveyor (7) for transferring the bottles to a filling apparatus or to feed a bottle processing machine.

12 Claims, 4 Drawing Sheets

STAR-SHAPED CONVEYOR FOR FEEDING OR DISCHARGING EMPTY PLASTICS CONTAINERS OR BOTTLES TO OR FROM A MACHINE AND ORIENTING AND ALGINING MACHINE HAVING SAID STAR-SHAPED CONVEYOR

BRIEF DESCRIPTION OF THE INVENTION

The present invention relates to a star-shaped conveyor for feeding or discharging empty plastics containers or bottles to or from a machine and an aligning and orienting machine comprising said star-shaped conveyor.

A star-shaped conveyor is a conveyor comprising a disk rotating around its vertical axis, a plurality of regularly or-not regularly spaced apart recesses or indentations are formed in its periphery, these indentations or recesses are adapted to receive and transfer empty bottles to a machine and from a bottle processing machine, e.g. a rinsing machine or an orienting and aligning machine The star-shaped conveyor which supplies/takes bottles to/from the bottle processing machine, must be perfectly synchronized with the same machine in order to avoid jamming.

According to the present needs, all of the empty bottle processing machines must process bottles of different shapes or bottles having the same shape but different capacity.

As the shape is changed, the prior art star-shaped conveyors must be subjected to complex mechanical modifications, and sometimes it is even necessary to change also the shape and the pitch of the recesses defined in the star-shaped conveyor.

Extremely complicate star-shaped conveyors having changeable indentations are known, which require time-consuming adjustments and consequently long downtimes whenever the bottle size is changed.

The object of the present invention is to implement a star-shaped conveyor designed to transport bottles of varying sizes or capacities without changing the recess shape.

Another object is to simplify the operation of discharging the empty bottles even the deformed ones. These and other objects will be achieved by a star-shaped conveyor for feeding or discharging empty plastics containers or bottles to or from a machine and an orienting and aligning machine including said star-shaped conveyor, object of the present invention, which are characterized by the attached claims.

BRIEF DESCRIPTION OF THE DRAWINGS

These and other characteristics will be better understood by the following description, given only in a non limiting illustrative way, of a preferred embodiment shown in the attached drawings, wherein.

DESCRIPTION OF THE PREFERRED EMBODIMENTS

Figure 1:
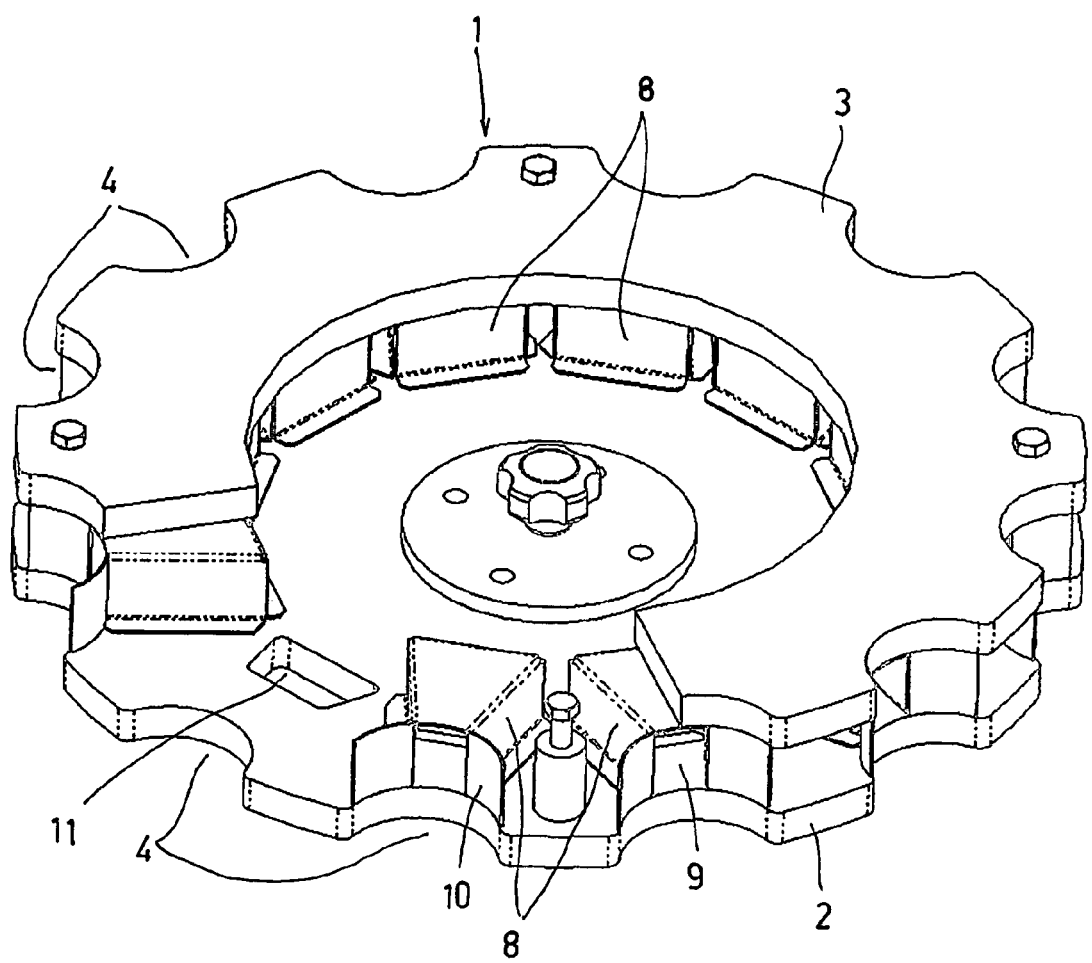
FIG. 1 is a perspective view of the star-shaped conveyor partially sectioned to show some details.

Referring to FIG. 1, reference number 1 generally shows a star-shaped conveyor formed by two circular plates 2, 3, defining along their peripheries indentations or recesses 4 adapted to receive bottles 6 coming, in the example shown, from a machine 5 for orienting and aligning empty plastics bottles 6.

The bottles exiting said machine are transferred on a mechanical or pneumatic conveyor 7 which transports them to a filling apparatus.

Box elements 8 are sandwiched between the two plates 2, 3. Each box-element has a face 10 shaped to perfectly follow the curvilinear outline of the recesses 4 and formed in dependence on the biggest bottles. A vertical opening 9 is defined in each face 10.

The lower face of each box element 8 is opened and abuts the lower plate 2 in correspondence of horizontal openings 11.

Openings 11 are defined along a circumference and overlap an underlying slot 12 defined in a surface 13 of a cylindrical chamber 14 in which there is a negative pressure.

Slot 12 span an arc varying from 90° to 180°.

The cylindrical chamber 14 is connected by a tube 15 to a fan 16 which sucks air from said chamber in order to establish said negative pressure.

The vertical opening or slot 9 of each box element 8 must have a width that assures a contact with a bottle having the lowest diameter that the star-shaped conveyor can process, in this way it is possible to process every bottle having a greater diameter obviously up to the maximum limit determined by the recess depth and cross-section. The star-shaped conveyor is rotatively driven by known and not illustrated driving means which are independent or connected to a machine which the conveyor is connected to.

The operation of the star-shaped conveyor will follow,

All of the box elements located on the slot 12 are connected to the cylindrical chamber 14 from which air is sucked by the fan, in this way every container which will come in front of the above mentioned slots will be sucked and hold in the recess until the box element will depart from the slot 12.

In the shown example, the bottles will be held for a 180° arc, anyway by extending or shortening the arc it will be possible to change the bottle discharge position with respect to the take up position.

To this end, there is provided a sliding door (not shown) to reduce the working arc of said slot and consequently change the angular discharge position.

In addition, the star-shaped conveyor is also rotated around its vertical axis by driving means which are not expressly described and shown, said driving means can be independent or dependent on the machine for introducing or taking bottles which the conveyor is connected to.

Figure 2:
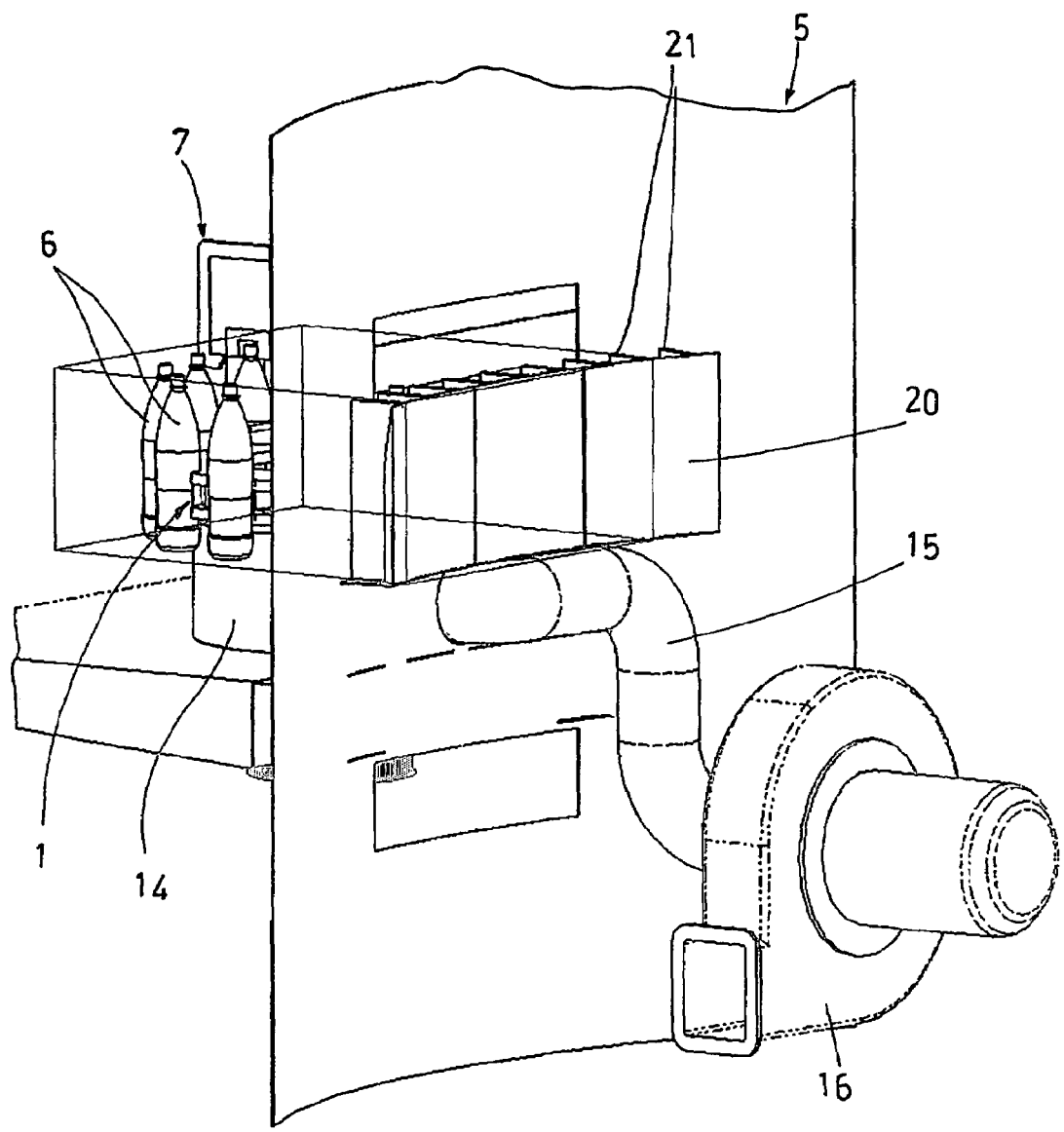
FIG. 2 is a perspective view of a sucking apparatus mounted to the star-shaped conveyor.
Figure 3:
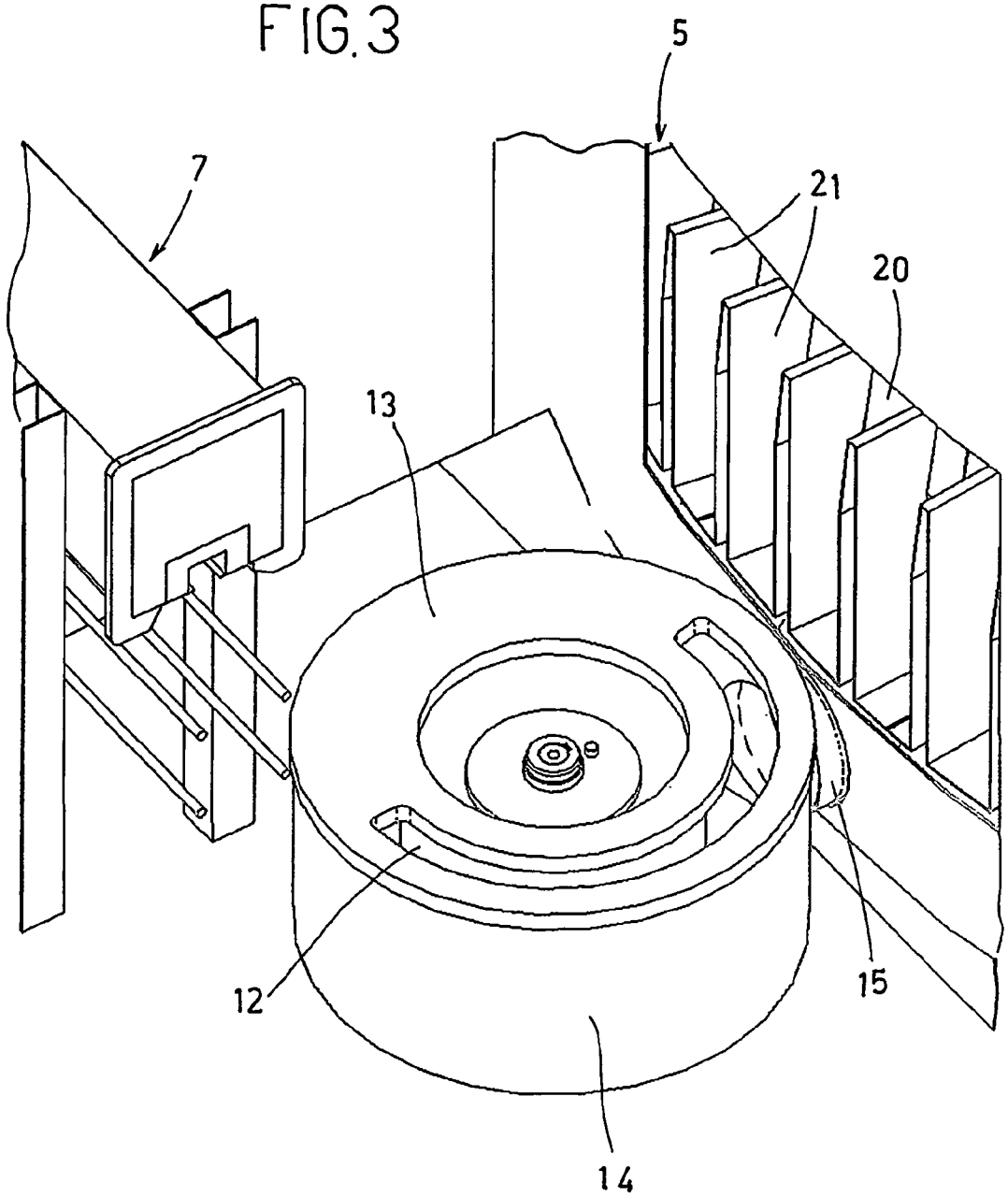
FIG. 3 is a perspective view of a vacuum source located under the star-shaped conveyor.
Figure 4:
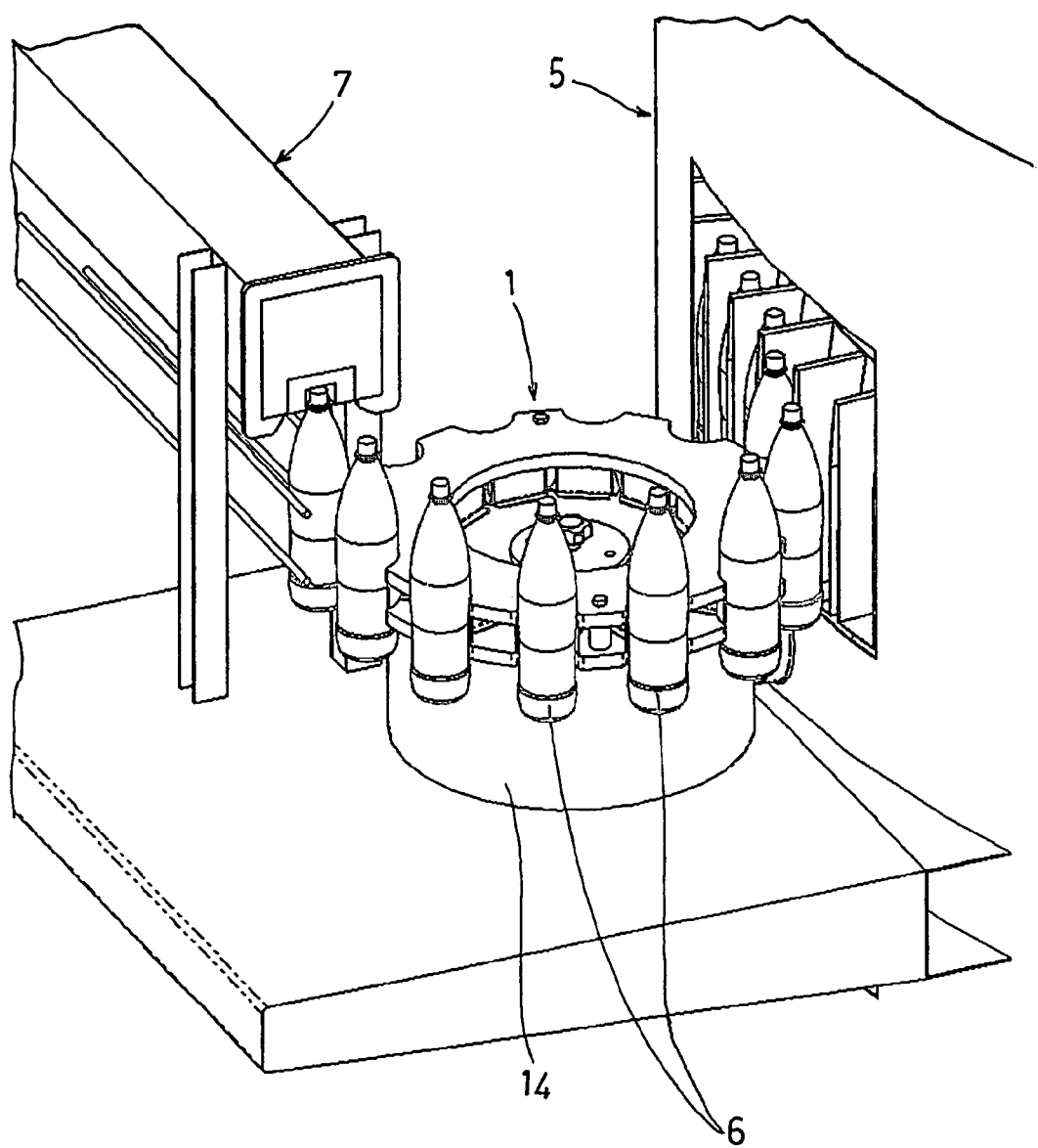
FIG. 4 is a perspective view of the star-shaped conveyor mounted to a machine for orienting and aligning empty plastics bottles.

As it is shown in FIGS. 2, 3 and 4, the star-shaped conveyor can be preferably but not exclusively applied in a machine for orienting and aligning bulk bottles received in a cylindrical container of said machine.

As a matter of fact, the latest models of said machines must be capable to process different types of containers particularly of different capacity such as the mineral water filling apparatus which must process bottles of half liter to two liters.

Said machines, such as the machine described in the Italian patent N. 1287097, are provided with two or more discharge locations for increasing their productivity and require a carousel 20 carrying a plurality of spacers 21 forming a number of channels which is multiple of a number of the funnel discharge channels minus one.

The discharge channels, not shown, are located above the spacers and they are carried by a cylindrical wall which rotates around a vertical axis at a speed different from that of the carousel 20 carrying the spacers.

Therefore it is necessary to have a star-shaped conveyor for picking up the bottles from the spacers and transporting them along a predetermined direction; by means of two star-shaped conveyors and keeping unchanged the rotation direction of the aligning machine, it is possible to feed bottles along a direction opposite to that shown in figures.

Applying the star-shaped conveyor which holds bottles by a negative pressure attached to an aligning machine it is possible to obtain several advantages, among them:

the shape of the spacers and/or discharge channels is simplified.

It is possible to get rid of a bottle sliding surface because bottles travel hanging and held by their bodies.

It is possible to get rid of the devices for extracting defective and crushed bottles.

The above described star-shaped conveyor can be applied at the exit of a rinsing machine, wherein an incorrect synchronization of the star-shaped conveyor with the machine can break the bottles.

For making easier the insertion of the bottles by the pneumatic conveyor 7 according to bottle size change, the conveyor can be provided with means for rising or lowering it, or the star-shaped conveyor, which can have and independent driving means or dependent on the machine which is connected to, must be capable of moving vertically.

The star-shaped conveyor can be rotated by driving a slotted shaft which, in turn, rotates a sleeve coupled to said slotted shaft, which in turn rotates said star-shaped conveyor.

The cylindrical stationary chamber must also obviously follow the vertical motion of the star-shaped conveyor.

The invention claimed is:

1. Star-shaped conveyor for transporting or taking out empty plastics containers or bottles to or from a machine of a type comprising a plurality of indentations (4) uniformly distributed along the periphery of two spaced apart plates (2 and 3), characterized by the fact vacuum is provided in each indentation capable of holding the empty bottle tightly against the indentation surface for a predetermined circumferential arc.

2. Star-shaped conveyor according to claim 1 characterized by the fact each indentation is provided with a box element supported by the lower plate (2) defining openings (11), the number of openings (11) being equal to the number of indentations, openings (11) are arranged along a circumference overlaying a slot (12) defined on a cylindrical chamber (14) in which vacuum is created, each box element has a vertical opening (9) made in one (10) of its faces which follows the curvilinear profile of the indentation.

3. Star-shaped conveyor according to claim 2, characterized by the fact the slot (12) extends along an arc comprised between 90° and 180° starting from the discharge of an operative machine to the inlet of a conveyor for transporting bottles.

4. Machine for aligning and orienting plastics bottles of a type comprising a star-shaped conveyor located at the discharge for taking out the bottles and provided with a plurality of indentations uniformly arranged along the periphery of two spaced apart plates, characterized by the fact vacuum is provided in each indentation capable of holding and transporting the empty bottle tightly against the indentation surface for a predetermined circumferential arc.

5. Machine according to claim 4, characterized by the fact that the star-shaped conveyor is driven by the same driving means of the aligning and orienting machine.

6. Machine according to claim 4, characterized by the fact the star-shaped conveyor has it own driving means independent from the machine driving means.

7. Machine according to claim 4, further characterized by the fact each indentation is provided with a box element supported by the lower plate (2) defining openings (11), the number of openings (11) being equal to the number of indentations, openings (11) are arranged along a circumference overlaying a slot (12) defined on a cylindrical chamber (14) in which vacuum is created, each box element has a vertical opening (9) made in one (10) of its faces which follows the curvilinear profile of the indentation.

8. Star-shaped conveyor according to claim 1, characterized by the fact each indentation defines a vacuum opening (9) made in the indentation surface.

9. Machine according to claim 4, characterized by the fact each indentation defines a vacuum opening (9) made in the indentation surface.

10. Star-shaped conveyor, comprising two spaced apart plates (2, 3);

a plurality of indentations (4) uniformly distributed along a periphery of two spaced apart plates, each indentation having an indentation surface defining a curvilinear profile for holding an empty bottle;

vacuum provided to each indentation, the vacuum sized to hold the empty bottle tightly against the indentation surface for a predetermined circumferential arc;

a box element associated each indentation, each box element supported by the lower plate and defining an opening (11), the number of openings (11) being equal to the number of indentations, a face of each box following the curvilinear profile;

a cylindrical chamber (14) in which the vacuum is created;

a vertical opening (9) within the face of each box that follows the curvilinear profile; and a slot (12) the cylindrical chamber (14), wherein, the openings (11) are arranged along a circumference overlaying the slot (12).

11. The Star-shaped conveyor of claim 10, wherein, the slot (12) extends along an arc comprised between 90° and 180°.

12. The Star-shaped conveyor of claim 11, wherein, the slot extends from a discharge of an operative machine to an inlet of a conveyor for transporting bottles.

* * * * *

(12) EX PARTE REEXAMINATION CERTIFICATE (8625th)
United States Patent
Lanfranchi

(10) Number: US 7,219,790 C1
(45) Certificate Issued: Oct. 11, 2011

(54) STAR-SHAPED CONVEYOR FOR FEEDING OR DISCHARGING EMPTY PLASTICS CONTAINERS OR BOTTLES TO OR FROM A MACHINE AND ORIENTING AND ALGINING MACHINE HAVING SAID STAR-SHAPED CONVEYOR

(75) Inventor: Lino Lanfranchi, Collecchio (IT)

(73) Assignee: Lanfranchi S.R.I., Collecchio (Parma) (IT)

Reexamination Request:
No. 90/009,836, Dec. 13, 2010

Reexamination Certificate for:
Patent No.: 7,219,790
Issued: May 22, 2007
Appl. No.: 10/541,398
Filed: Jul. 1, 2005

(22) PCT Filed: Jan. 22, 2004

(86) PCT No.: PCT/EP2004/000508
§ 371 (c)(1),
(2), (4) Date: Jul. 1, 2005

(87) PCT Pub. No.: WO2004/074144
PCT Pub. Date: Sep. 2, 2004

(30) Foreign Application Priority Data
Feb. 19, 2003 (IT) .................................. PR2003A0013

(51) Int. Cl.
*B65G 47/34* (2006.01)

(52) U.S. Cl. ................. 198/471.1; 198/478.1; 198/689.1
(58) Field of Classification Search .................. None
See application file for complete search history.

(56) References Cited

U.S. PATENT DOCUMENTS

| | | |
|---|---|---|
| 2,800,226 A | 7/1957 | Drennan |
| 3,115,970 A | 12/1963 | Husome |
| 3,133,638 A | 5/1964 | Calhoun |
| 3,279,599 A | 10/1966 | Drennan |
| 3,351,198 A | 11/1967 | Wyman |
| 5,392,928 A | 2/1995 | Nickey et al. |
| 5,531,312 A | 7/1996 | Dickey |
| 6,098,781 A * | 8/2000 | Lanfranchi ................. 198/400 |

* cited by examiner

*Primary Examiner* — Robert M. Fetsuga

(57) ABSTRACT

The invention refers to the field of systems for conveying empty plastics bottles and more precisely to a star-shaped conveyor adapted to feed or discharge empty bottles to or from an operative machine. Preferably, but not exclusively, the machine which the star-shaped conveyor is connected to, is a machine for orienting and aligning empty plastics bottles or containers. The star-shaped conveyor is provided with a plurality of recesses (4), a negative pressure is established in each recess for an arc between 90° and 180°, the arc starts in correspondence of a machine and ends in correspondence of a conveyor (7) for transferring the bottles to a filling apparatus or to feed a bottle processing machine.

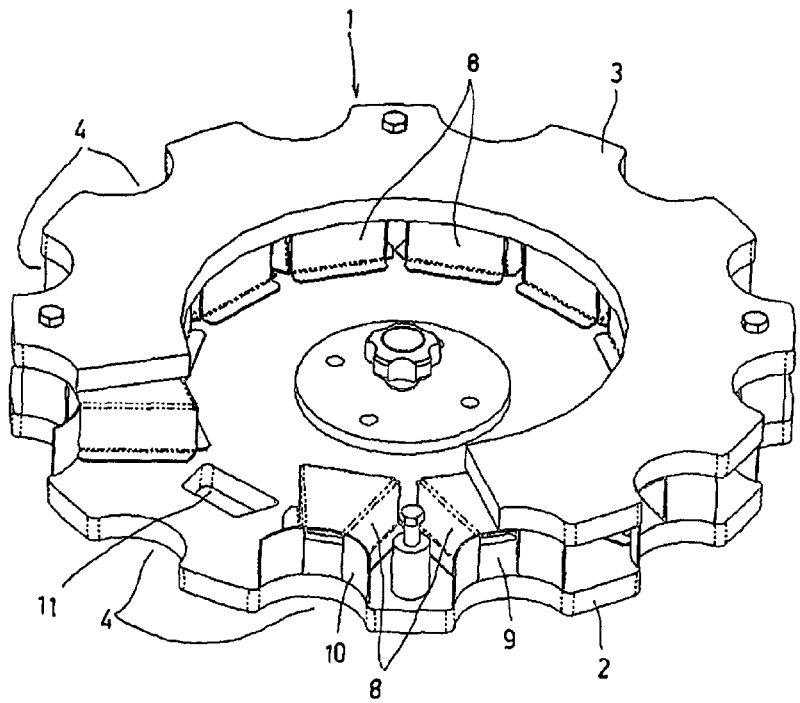

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2, 3, 7 and 10-12 is confirmed.

Claims 1, 4-6, 8 and 9 are cancelled.

\* \* \* \* \*